(12) United States Patent
Fontecave et al.

(10) Patent No.: US 11,661,662 B2
(45) Date of Patent: May 30, 2023

(54) METAL/METAL CHALCOGENIDE ELECTRODE WITH HIGH SPECIFIC SURFACE AREA

(71) Applicants: Paris Sciences et Lettres—Quartier Latin, Paris (FR); Centre National de la Recherche Scientifique (CNRS), Paris (FR); Sorbonne Universite, Paris (FR)

(72) Inventors: Marc Fontecave, Saint Ismier (FR); Victor Mougel, Paris (FR); Ngoc Huan Tran, Antony (FR)

(73) Assignees: Paris Sciences et Lettres, Paris (FR); Centre National de la Recherche Scientifique (CNRS), Paris (FR); Sorbonne Universite, Paris (FR)

( * ) Notice: Subject to any disclaimer, the term of this patent is extended or adjusted under 35 U.S.C. 154(b) by 438 days.

(21) Appl. No.: 16/096,740

(22) PCT Filed: Mar. 31, 2017

(86) PCT No.: PCT/EP2017/057756
§ 371 (c)(1),
(2) Date: Oct. 26, 2018

(87) PCT Pub. No.: WO2017/186454
PCT Pub. Date: Nov. 2, 2017

(65) Prior Publication Data
US 2019/0119822 A1   Apr. 25, 2019

(30) Foreign Application Priority Data
Apr. 27, 2016   (FR) ..................................... 1653753

(51) Int. Cl.
*C25B 11/093* (2021.01)
*C25D 7/00* (2006.01)
(Continued)

(52) U.S. Cl.
CPC .............. *C25B 11/093* (2021.01); *C25B 1/04* (2013.01); *C25B 11/075* (2021.01);
(Continued)

(58) Field of Classification Search
CPC ........ C25B 11/04–11/097; H01M 4/02–4/928; C25D 7/00; C25D 3/38; C25D 5/48
See application file for complete search history.

(56) References Cited

U.S. PATENT DOCUMENTS 4,214,954 A   7/1980   Kuo
5,326,454 A   7/1994   Engelhaupt
(Continued)

FOREIGN PATENT DOCUMENTS

KR    101555532 B1    9/2015
WO    2015170987 A1   11/2015

OTHER PUBLICATIONS

Ke et al. ("An efficient and transparent copper sulfide nanosheet film counter electrode for bifacial quantum dot-sensitized solar cells", Journal of Power Sources, 248, 2014, pp. 809-815). (Year: 2014).*
(Continued)

*Primary Examiner* — Alexander W Keeling
(74) *Attorney, Agent, or Firm* — Banner & Witcoff, Ltd.

(57) ABSTRACT

The present invention relates to an electrode comprising an electrically conductive substrate of which at least one portion of the surface is covered with a metal deposit of copper, the surface of said deposit being in an oxidised, sulphurised, selenised and/or tellurised form and the deposit having a specific surface area of more than 1 $m^2/g$; a method for preparing such an electrode; and a method for oxygenising water with dioxygen involving such an electrode.

18 Claims, 12 Drawing Sheets

(51) Int. Cl.
  C25D 3/38    (2006.01)
  C25D 5/48    (2006.01)
  C25B 11/075  (2021.01)
  C25B 11/077  (2021.01)
  C25B 1/04    (2021.01)
  H01M 4/88    (2006.01)
  H01M 4/90    (2006.01)

(52) U.S. Cl.
  CPC .............. C25B 11/077 (2021.01); C25D 3/38 (2013.01); C25D 5/48 (2013.01); C25D 7/00 (2013.01); H01M 4/8853 (2013.01); H01M 4/9041 (2013.01); H01M 4/9016 (2013.01); Y02E 60/36 (2013.01)

(56) References Cited

U.S. PATENT DOCUMENTS

| | | | | |
|---|---|---|---|---|
| 6,448,492 | B1* | 9/2002 | Okada | H01J 29/868 |
| | | | | 174/389 |
| 2016/0215404 | A1* | 7/2016 | Palmore | C25B 11/04 |

OTHER PUBLICATIONS

Ji ("Fabrication and electromagnetic interference shielding performance of open-cell foam of a Cu—Ni alloy integrated with CNTs", Applied Surface Science, 311, 2014, pp. 351-356) (Year: 2014).*

Ke ("An efficient and transparent copper sulfide nanosheet film counter electrode for bifacial quantum dot-sensitized solar cells", Journal of Power Sources, 248, 2014, pp. 809-815). (Year: 2014).*

Du et al. "Copper as a Robust and Transparent Electrocatalyst for Water Oxidation". Angew. Chem. Int. Ed. 2015, 54, 2073-2078 DOI:10.1002/anie.201408854.

Kanan et al. "In Situ Formation of an Oxygen-Evolving Catalyst in NeutralWater Containing Phosphate and Co2+". Science Magazine. Aug. 22, 2008, vol. 321, 1072-1075.

Liu et al. "Self-Supported Copper Oxide Electrocatalyst for Water Oxidation at Low Overpotential and Confirmation of Its Robustness by Cu K?Edge X?ray Absorption Spectroscopy". J. Phys. Chem. C2016, 120, 831-840. DOI: 10.1021/acs.jpcc.5b09818.

Liu et al. "Cuprous oxide thin film directly electrodeposited from a simple copper salt on conductive electrode for efficient oxygen evolution reaction". Electrochimica Acta 187 (2016) 381-388. DOI:10.1016/j.electacta.2015.11.059.

Nocera, Daniel G. "The Artificial Leaf". Accounts of Chemical Research. vol. 45, No. 5, 2012, 767-776. DOI:10.1021/ar2003013.

Joya, Khurram S. et al. "Controlled Surface-Assembly of Nanoscale Leaf-Type Cu-oxide Electrocatalyst for High Activity Water Oxidation". ACS Catalysis. 2016, 6, No. 3, 1768-1771. DOI: 10.1021/acscatal.5b02950; XP055370865.

* cited by examiner

A)

B)

METAL/METAL CHALCOGENIDE ELECTRODE WITH HIGH SPECIFIC SURFACE AREA

RELATED APPLICATION DATA

This application is a National Stage Application under 35 U.S.C. 371 of PCT application number PCT/EP2017/057756 designating the United States and filed Mar. 31, 2017; which claims the benefit of FR application number 1653753 and filed Apr. 27, 2016 each of which are hereby incorporated by reference in their entireties.

The object of the present invention is a metal/metal chalcogenide (in particular metal oxide or sulphide, notably copper oxide or sulphide) electrode with high specific surface area and the process for preparing said electrode, as well as an electrochemical device containing same and the use thereof notably in electrolysis processes and more particularly for oxidizing water to dioxygen.

The oxidation of water to dioxygen (also called the oxygen evolution reaction, OER) is a key reaction in the use of water as a source of electrons, notably in the context of electrochemical and photoelectrochemical devices used to reduce compounds such as carbon dioxide or water itself. This reaction may be schematized as follows:

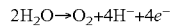

$$2H_2O \rightarrow O_2 + 4H^- + 4e^-$$

An efficient water oxidation system requires the use of catalytic systems that have good stability and good selectivity but above all that allow catalysis of the reaction at high current density and with low overvoltage. Such a catalytic system is particularly difficult to obtain because the reaction involves the loss of four protons and four electrons. An efficient transfer of electrons and protons is thus necessary.

Since the 1970s, a large number of catalytic systems have been proposed. Most early systems consisted of molecular complexes or metal oxides of iridium or ruthenium. However, the rarity and cost of these noble metals limit their use, particularly on an industrial scale. Recently, significant research efforts have been dedicated to replacing these metals with more abundant and less expensive metals to enable a wider application of these electrochemical and photoelectrochemical systems.

Examples of catalysts based on Co, Ni, Fe or Mn have been proposed, whether in heterogeneous or molecular catalyst systems (Nocera 2012). While these systems have achieved good catalytic activities, particularly with cobalt-based materials, they still suffer from relatively low current densities and high overvoltages (for example 0.1 mA/cm$^2$ at 320 mV overvoltage has been observed for a cobalt phosphate catalyst, see Kanan et al. 2008).

Recently, heterogeneous electrodes based on cupric oxide (CuO) or electrodes base on cuprous oxide (Cu$_2$O) have been developed for oxidizing water to dioxygen (Liu et al. 2016 (a) and (b)). The results obtained were comparable to those obtained with cobalt-based systems but using a much less expensive material, with copper being 5 times less expensive than cobalt. However, these electrodes still suffer from an overvoltage too high for the production of dioxygen.

There is therefore still a real need to develop novel catalytic systems capable of catalysing the water oxidation reaction with high current density and low overvoltage.

The first object of the present invention is thus an electrode comprising an electrically conductive substrate of which at least one part of the surface is covered with a deposit of a metal selected from the group consisting of copper, iron, nickel, zinc, cobalt, manganese, titanium and a mixture thereof, and preferably being copper, the surface of said deposit being in oxidized, sulphurized, selenized and/or tellurized form and the deposit having a high specific surface area, and more particularly a specific surface area greater than or equal to 1 m$^2$/g.

Such an electrode may be used to catalyse the water oxidation reaction with high current density and low overvoltage (typically 10 mA/cm$^2$ at less than 350 mV overvoltage). Surprisingly, such an electrode gives much better results than those obtained in the prior art with, for example, an electrode consisting of a cobalt phosphate deposit on a conductive electrode (1 mA/cm$^2$ at 410 mV overvoltage—Kanan et al. 2008) or using a copper/copper oxide electrode (1 mA/cm$^2$ at 485 mV—Du et al. 2015)

An "electrode", within the meaning of the present invention, is an electronic conductor capable of capturing or releasing electrons. The electrode that releases electrons is called the anode. The electrode that captures electrons is called the cathode.

An "electrically conductive substrate", within the meaning of the present invention, is a substrate capable of conducting electricity.

Such a substrate will consist, at least in part and preferably totally, of an electrically conductive material which may be a composite material consisting of several distinct electrically conductive materials. The electrically conductive material may be selected notably from a metal such as copper, steel, aluminium, zinc or titanium; a metal oxide such as titanium oxide doped with fluorine (FTO—Fluorine-doped Tin Oxide) or tin oxide doped with indium (ITO—Indium Tin Oxide); a metal sulphide such as cadmium sulphide or zinc sulphide; carbon, notably in the form of carbon felt, graphite, vitreous carbon, boron-doped diamond; a semiconductor such as silicon; and a mixture thereof.

This substrate may take any shape suitable for use as an electrode, the skilled person being able to determine the shape and dimensions of such a substrate according to the intended use.

The surface of such a substrate is covered at least partially with the metal deposit. Advantageously, at least 5%, in particular at least 20%, notably at least 50%, preferably at least 80%, of the surface of the substrate is covered with the metal deposit. According to a particular embodiment, the entire surface of the substrate is covered with the metal deposit.

Within the meaning of the present invention, a "deposit of a metal" or a "metal deposit" is a deposit of a metal (which may be in the form of a mixture of metals) in oxidation state 0. The metal deposit thus forms a metal layer on the surface of the substrate.

The metal is advantageously deposited on the substrate by electrodeposition.

The metal deposit advantageously has a thickness comprised between 10 µm and 2 mm, notably comprised between 50 µm and 0.5 mm, preferably comprised between 70 µm and 300 µm.

Such a thickness can be measured notably by measuring a sample section by scanning electron microscopy (SEM).

The metal deposit has a high specific surface area.

More particularly, the metal deposit has a specific surface area greater than or equal to 1 m$^2$/g, notably greater than or equal to 2 m$^2$/g, in particular greater than or equal to 3 m$^2$/g, for example greater than or equal to 5 m$^2$/g or greater than or equal to 10 m$^2$/g. The specific surface area may be comprised between 1 m$^2$/g and 500 m$^2$/g, for example between 1 m$^2$/g and 200 m$^2$/g, notably comprised between 2 m²/g and 100 m²/g, preferably comprised between 3 m²/g and 50 m²/g, for example comprised between 5 m²/g and 50 m²/g or comprised between 10 m²/g and 50 m²/g. The specific surface area value is indicated per gram of metal deposit. Such a specific surface area is advantageously determined by the BET (Brunauer, Emmett and Teller) method. This BET method will advantageously be applied to a metal deposit sample obtained by mechanical abrasion, using a 1 mm thick PVC (poly(vinyl chloride)) blade, of said metal deposit present on the electrically conductive substrate.

The specific surface area can also be expressed in $cm^2/cm^2_{geometric}$. In this case, the specific surface area value is indicated per $cm^2$ of electrode and may advantageously be greater than or equal to 5 $cm^2/cm^2_{geometric}$, notably greater than or equal to 10 $cm^2/cm^2_{geometric}$, in particular greater than or equal to 15 $cm^2/cm^2_{geometric}$. The specific surface area may be comprised between 5 and 500 $cm^2/cm^2_{geometric}$, for example between 10 and 200 $cm^2/cm^2_{geometric}$, notably comprised between 15 and 100 $cm^2/cm^2_{geometric}$, preferably comprised between 15 and 50 $cm^2/cm^2_{geometric}$. Such a specific surface area is advantageously determined by electrochemical measurement (via the Randles-Sevcik equation), more particularly according to the conditions described below in the general considerations of the experimental section.

The metal deposit will also advantageously have a porous structure.

The metal deposit will advantageously have a porosity with an average pore size comprised between 10 μm and 500 μm, notably between 20 μm and 200 μm, preferably between 30 μm and 70 μm. The average pore size may be determined by photographs obtained by scanning electron microscopy or scanning tunneling microscopy, more particularly according to the conditions described below in the general considerations of the experimental section.

The metal deposited on the substrate is selected from copper, iron, nickel, zinc, cobalt, manganese, titanium and a mixture thereof, notably selected from copper, iron, nickel, zinc and a mixture thereof. The metal may more particularly be copper.

Other metals (other than the main metal mentioned above) may be present in this metal deposit layer, such as gold, silver, lead, ruthenium, iridium or a mixture thereof. Advantageously, these other metals will not represent more than 80%, notably not more than 50% by weight, preferably not more than 30% by weight of the metal deposit layer.

The surface of this metal deposit (that is to say, the outer surface of the metal deposit not in contact with the electrically conductive substrate) is in an oxidized, sulphurized, selenized and/or tellurized form, meaning that the metal on the surface of this metal deposit is in an oxidized, sulphurized, selenized and/or tellurized form.

Within the meaning of the present invention, the "oxidized, sulphurized, selenized and/or tellurized form" of a metal M refers to the chemical forms $M_xO_y$, $M_xS_y$, $M_xSe_y$, $M_xTe_y$, and mixtures thereof where x and y represent integers depending on the oxidation state of the metal M. For example, in the case of copper, the oxidized forms may be CuO and $Cu_2O$ (preferably CuO), the sulphurized forms may be CuS and $Cu_2S$ (preferably CuS), the selenized forms may be CuSe and $Cu_2Se$ and the tellurized forms may be CuTe and $Cu_2Te$. Preferably it will be an oxidized and/or sulphurized form, notably oxidized or sulphurized. It will be in particular the CuO or CuS forms.

According to a particular embodiment of the invention, the surface of the metal deposit is in an oxidized, sulphurized, selenized or tellurized form.

According to another particular embodiment of the invention, the surface of the metal deposit is in an oxidized and/or sulphurized form, notably oxidized or sulphurized.

The thickness of the oxidized, sulphurized, selenized and/or tellurized layer on the surface of the metal deposit is not critical. It may be for example comprised between 1 nm and 1 μm, preferably comprised between 10 and 500 nm. In example 1, the oxidized layer has a thickness of about 250 nm.

This thickness can be measured by transmission electron microscopy (TEM) of a section of the electrode made by the focused ion beam technique.

This metal deposit which is oxidized, sulphurized, selenized and/or tellurized in surface represents the catalytic system for carrying out notably an oxidization of water to dioxygen in an electrolysis process.

The second object of the present invention is a process for preparing an electrode according to the present invention comprising the following successive steps:

(i) electrodeposition of a metal selected from the group consisting of copper, iron, nickel, zinc, cobalt, manganese, titanium and a mixture thereof, and preferably being copper, on at least one part of the surface of an electrically conductive substrate so as to form a deposit of said metal on said at least one part of the surface of the electrically conductive substrate, and (ii) oxidation, sulphurization, selenization and/or tellurization of the surface of said metal deposit.

The electrically conductive substrate will be as defined above. Thus, such a substrate will consist, at least in part and preferably totally, of an electrically conductive material which may be a composite material consisting of several distinct electrically conductive materials. The electrically conductive material may be selected notably from a metal such as copper, steel, aluminium, zinc, titanium; a metal oxide such as titanium oxide doped with fluorine (FTO—Fluorine-doped Tin Oxide) or tin oxide doped with indium (ITO—Indium Tin Oxide); a metal sulphide such as cadmium sulphide or zinc sulphide; carbon, notably in the form of carbon felt, graphite, vitreous carbon, boron-doped diamond; a semiconductor such as silicon; and a mixture thereof.

This substrate may take any shape suitable for use as an electrode, the skilled person being able to determine the shape and dimensions of such a substrate according to the intended use. The surface of such a substrate is covered at least partially with the metal deposit. Advantageously, at least 5%, in particular at least 20%, notably at least 50%, preferably at least 80%, of the surface of the substrate is covered with the metal deposit. According to a particular embodiment, the entire surface of the substrate is covered with the metal deposit.

This electrically conductive substrate will advantageously be cleaned before electrodeposition is carried out according to techniques well known to the skilled person.

The metal deposited on the substrate will advantageously be selected from copper, iron, nickel, zinc, cobalt, manganese, titanium and a mixture thereof, notably from copper, iron, nickel, zinc and a mixture thereof. The metal may more particularly be copper.

Step (i):

Electrodeposition may advantageously be carried out according to the following steps:
(a) at least partial immersion of the electrically conductive substrate in an acidic aqueous solution containing ions of the metal to be deposited, and
(b) application of a current between the electrically conductive substrate and a second electrode.

Step (a):

The acidic aqueous solution containing ions of the metal to be deposited will more particularly be an acidic aqueous solution containing a salt of the metal to be deposited (also called metal salt), optionally introduced in a hydrated form. This metal salt, optionally in a hydrated form, may be any water-soluble salt of said metal. It may be for example:
for copper: $CuSO_4$, $CuCl_2$, $Cu(ClO_4)_2$,
for iron: $FeSO_4$, $Fe_2(SO_4)_3$, $FeCl_3$, $FeCl_2$, $Fe(ClO_4)_3$,
for nickel: $NiSO_4$, $NiCl_2$, $Ni(ClO_4)_2$,
for zinc: $ZnSO_4$, $ZnCl_2$, $Zn(ClO_4)_2$,
for cobalt: $CoSO_4$, $CoCl_2$, $Co(ClO_4)_2$,
for manganese: $MnCl_2$, $MnSO_4$, $Mn(ClO_4)_2$,
for titanium: $TiCl_3$, $Ti_2(SO_4)_3$,
or a mixture thereof.

It may be in particular $CuSO_4$.

The metal salt will be present in the solution advantageously at a concentration comprised between 0.1 mM and 10 M, notably comprised between 1 mM and 1 M.

It may also be envisaged to use metal complexes formed between the ion of the metal to be deposited and one or more organic ligands such as for example porphyrins, amino acids or amines, to introduce the metal ions into the aqueous solution.

The acid introduced into the aqueous solution may be any acid, whether organic or inorganic. It may be for example sulphuric acid, hydrochloric acid, hydrobromic acid, formic acid or acetic acid, notably sulphuric acid. Preferably, it will not be nitric acid. This acid may be present in the acidic aqueous solution advantageously at a concentration comprised between 0.1 mM and 10 M, notably comprised between 10 mM and 3 M.

The acidic aqueous solution is advantageously prepared using deionized water to better control the ionic composition of the solution.

The electrically conductive substrate will be totally or partially immersed in the acidic aqueous solution containing the ions of the metal to be deposited depending on whether a deposit over the entire surface or only a part of the surface of the substrate is desired.

In order to obtain a deposit on only a part of the surface of the substrate, it may also be envisaged to apply a mask made of an insulating material on the parts of the substrate that should not be covered with the metal deposit. In this case, the complete substrate, on which the mask has been applied, may be immersed in the acidic aqueous solution containing the ions of the metal to be deposited. This mask will be removed from the substrate after the metal has been deposited.

Step (b):

In this step, the electrically conductive substrate will act as cathode, while the second electrode will act as anode.

The second electrode will advantageously be immersed in the acidic aqueous solution containing the ions of the metal to be deposited but may also be immersed in another electrolyte solution electrically connected to the first. The use of a single electrolyte solution, namely the acidic aqueous solution containing the ions of the metal to be deposited, remains preferred.

The nature of the second electrode is not critical. It is only necessary for carrying out electrodeposition by an electrolysis process. It may be for example a platinum or titanium electrode.

The current applied between the electrically conductive substrate and the second electrode may be alternating or direct. It will advantageously be direct and preferably will have a high current density comprised between 0.1 mA/cm² and 5 A/cm², notably comprised between 0.1 mA/cm² and 1 mA/cm². Alternatively, a voltage to generate an equivalent current density may be applied between the electrodes.

When the current is applied, two reduction reactions will occur at the cathode:
on the one hand, the reduction of metal ions to metal in oxidation state 0 according to the following reaction with M representing the metal and x representing its initial oxidation state:

$$M^{x+} + xe^- \rightarrow M$$

and on the other, the reduction of protons to dihydrogen according to the following reaction:

$$2H^+ + 2e^- \rightarrow H_2$$

Similarly, an oxidation reaction will occur at the anode when the current is applied. The nature of this oxidation reaction is not crucial. This may be for example the oxidation of water.

Electrodeposition thus makes it possible to deposit on the surface of the electrically conductive substrate a thin layer of metal with a high specific surface area, the growth of the metal on the surface of the electrically conductive substrate being dendritic. In addition, the formation of dihydrogen bubbles on the surface of the electrically conductive substrate, thanks to the proton reduction reaction, also gives a porous structure to this metal deposit layer, thus further increasing this specific surface area. The choice of current density will notably make it possible to optimize the size and number of bubbles formed so as to obtain the desired structure and specific surface area for the metal deposit.

The current will also be applied for a sufficient time to obtain the desired amount of deposit, notably to obtain a thickness of said metal deposit layer comprised between 10 μm and 2 mm, notably comprised between 50 μm and 0.5 mm, preferably comprised between 70 μm and 300 μm. For example, the current may be applied for a duration comprised between 1 and 3600 s, for example between 15 and 1200 s, notably comprised between 30 and 300 s.

The application duration and the current density may be adapted according to the selected reaction conditions such as the nature and concentration of the metal ions, the acid concentration, etc., so as to obtain the desired metal deposit, notably with the desired specific surface area and thickness.

Electrodeposition will be carried out advantageously by a galvanostatic method, that is to say, by application of a constant current throughout the deposition process.

Once the current has been applied, the electrically conductive substrate of which at least one part of the surface is covered with a metal deposit may be removed from the solution in which it was immersed. It should be cleaned, notably with water (for example distilled water), before being dried, notably under vacuum, or under a stream of inert gas (argon, nitrogen, helium, etc.).

Step (ii):

Once the metal has been deposited on at least one part of the surface of the electrically conductive substrate, the outer surface of the metal deposit will be oxidized, sulphurized, selenized and/or tellurized.

The oxidation step will advantageously be carried out in an atmosphere containing dioxygen (e.g. air) or in the presence of $H_2O$, preferably in an atmosphere containing dioxygen (e.g. air). The sulphurization step will advantageously be carried out in the presence of elemental sulphur or $H_2S$, preferably in the presence of elemental sulphur. The selenization step will advantageously be carried out in the presence of elemental selenium or $H_2Se$, preferably in the presence of elemental selenium. The tellurization step will advantageously be carried out in the presence of elemental tellurium or $H_2Te$, preferably in the presence of elemental tellurium.

This oxidation, sulphurization, selenization and/or tellurization step will be carried out advantageously at a high temperature, notably at a temperature comprised between 30 and 700° C., notably comprised between 50 and 500° C., in particular comprised between 100 and 400° C.

An annealing step may be carried out following the oxidation, sulphurization, selenization and/or tellurization step. This annealing step will be carried out advantageously at a temperature comprised between 50° C. and 1000° C., in particular comprised between 100° C. and 400° C. This annealing step will be carried out advantageously in an atmosphere of inert gas (Ar, $N_2$, He, etc.) or under vacuum. This annealing step will be carried out advantageously for a sufficiently long duration, in particular for a time comprised between 10 min and 48 h, notably comprised between 1 and 3 h.

Surprisingly, a high specific surface area is maintained after this oxidation, sulphurization, selenization and/or tellurization and optionally annealing step.

Step (iii):

An additional step of depositing metal oxide on the surface of the metal deposit may optionally be performed after step (ii). This will make it possible to have an additional layer of metal oxide on the surface of the metal deposit.

The metal oxide will be an oxide of a metal selected from copper, iron, nickel, zinc, cobalt, manganese, titanium and a mixture thereof. Preferably, it will be copper oxide, and more particularly CuO.

This deposition of metal oxide may advantageously be carried out according to the following steps:
(1) immersion at least of the part of the electrically conductive substrate covered with a metal deposit the outer surface of which is oxidized, sulphurized, selenized and/or tellurized obtained in step (ii) in a solution containing ions of the metal of the metal oxide to be deposited (preferably copper ions) and advantageously water, and
(2) application of a potential between the electrically conductive substrate and a second electrode, the electric potential applied to the electrically conductive substrate being negative then positive.

Step (1):

The solution containing ions of the metal of the metal oxide to be deposited will more particularly be a solution containing a salt of the metal of the metal oxide to be deposited (also called metal salt), optionally introduced in a hydrated form. This metal salt, optionally in a hydrated form, may be any salt of said metal. For example, for copper, it may be $CuSO_4$, $CuCl_2$ or $Cu(ClO_4)_2$ or a mixture thereof.

It may also be envisaged to use metal complexes formed between the ion of the metal of the metal oxide to be deposited and one or more organic ligands such as for example porphyrins, amino acids or amines (e.g. imidazole, 1,4,8,11-tetraazacyclotetradecane (cyclam) or 1,4,8,11-tetramethyl-1,4,8,11-tetraazacyclotetradecane (cyclam) (Mea-cyclam), to introduce metal ions into the aqueous solution. In the case of copper, it may be $CuCl_2$ complexed with one or more, notably 1 or 2, organic, preferably nitrogenous ligands such as amines. It may be in particular Cu (imidazole)$_2Cl_2$, Cu(cyclam)$Cl_2$ or Cu (Mea-cyclam)$Cl_2$, preferably Cu (imidazole)$_2Cl_2$.

It will be in particular Cu(imidazole)$_2Cl_2$.

The metal salt will be present in the solution advantageously at a concentration comprised between 0.1 mM and 10 M, in particular comprised between 1 mM and 0.1 M.

The solution containing ions of the metal of the metal oxide to be deposited may be a solution in water and/or an organic solvent, notably in water or in a water/organic solvent mixture. The solvent used (water and/or organic solvent) will be selected so as to be able to solubilize the metal salt. The organic solvent may be any suitable solvent such as acetonitrile, pyridine, tetrahydrofuran (THF), dimethylsulphoxide (DMSO) or dimethylformamide (DMF), notably acetonitrile. The water used will preferably be deionized water to better control the ionic composition of the solution.

The solution may also contain a supporting salt, namely a salt that cannot be oxidized or reduced and therefore does not participate in the oxidation-reduction reaction but conducts the current. The nature of the supporting salt is therefore not critical. It should be selected so that it is soluble in the solvent used (water and/or organic solvent). It may be $TBAPF_6$ (tetrabutylammonium hexafluorophosphate) or $TBABF_4$ (tetrabutylammonium tetrafluoroborate).

The electrically conductive substrate will be totally or partially immersed in the solution containing the ions of the metal of the metal oxide to be deposited depending on the surface area of the substrate to be covered.

Step (2):

This step of deposition by cyclic voltammetry comprises two phases, namely:
application of a current ramp between the electrically conductive substrate and a second electrode to a negative electric potential applied to the electrically conductive substrate: this phase allows the electrodeposition of metal on the surface of the metal deposit obtained in step (ii), the electrically conductive substrate then acting as cathode and the second electrode acting as anode; then
application of a current ramp between the electrically conductive substrate and a second electrode to a positive electric potential applied to the electrically conductive substrate: this phase allows the oxidation of the metal deposited on the surface of the metal deposit obtained in step (ii), the electrically conductive substrate then acting as anode and the second electrode acting as cathode.

This step (2), comprising the two phases mentioned above, may be repeated once or several times so as to optimize the deposition of metal oxide and the performance of the electrode obtained. Advantageously, step (2) is performed once or twice, notably twice.

The second electrode will advantageously be immersed in the solution containing the ions of the metal of the metal oxide to be deposited but may also be immersed in another electrolyte solution electrically connected to the first. The use of a single electrolyte solution, namely the solution containing the ions of the metal of the metal oxide to be deposited and water, remains preferred.

The nature of the second electrode is not critical. It is only necessary for carrying out electrodeposition then oxidation. It may be for example a platinum or titanium electrode.

When the current is applied with a negative potential applied to the electrically conductive substrate, a reduction reaction will occur at the cathode (electrically conductive substrate), namely the reduction of metal ions to metal in oxidation state 0 according to the following reaction with M representing the metal and x representing its initial oxidation state:

$$M^{x+}+xe^-\rightarrow M.$$

Similarly, an oxidation reaction will occur at the anode when the current is applied. The nature of this oxidation reaction is not crucial. It may be for example the oxidation of water.

This phase thus allows the electrodeposition of a thin layer of metal on the surface of the metal deposit obtained in step (ii).

When the current is applied with a positive potential applied to the electrically conductive substrate in the presence of an oxygen source (which may be water, hydroxide ions, dioxygen or another oxygen source, preferably water), an oxidation reaction will occur at the anode (electrically conductive substrate), namely the oxidation of the metal, for example according to the following reaction in the case of water as an oxygen source with M representing the metal and x representing its oxidation state:

$$M+H_2O\rightarrow MO+2e^-+2H^+.$$

Similarly, a reduction reaction will occur at the cathode when the current is applied. The nature of this reduction reaction is not crucial. It may be for example the reduction of water $$2H_2O+2e^-\rightarrow H_2+2OH^-$$

This phase thus allows the oxidation of the thin layer of metal electrodeposited on the surface of the metal deposit obtained in step (ii).

This step (2) may advantageously be carried out by one or more, notably 1 or 2, cycles of cyclic voltammetry, that is to say, by application of a current varying linearly over time.

Once the metal oxide has been deposited, the electrically conductive substrate may be removed from the solution in which it was immersed. It should be cleaned, notably with water (for example distilled water), before being dried, notably under vacuum, or under a stream of inert gas (argon, nitrogen, helium, etc.).

The present invention thus also concerns an electrode obtainable by the above-mentioned process. Such an electrode corresponds to an electrode according to the present invention, having in particular the features mentioned above.

The third object of the present invention is an electrochemical device comprising an electrode according to the present invention.

An "electrochemical device", within the meaning of the present invention, is a device for converting electrical energy into chemical energy (for example an electrolysis device) or, conversely, for converting chemical energy into electrical energy (for example a fuel cell). The electrochemical device according to the present invention will therefore be more particularly an electrolysis device or a fuel cell.

Such an electrochemical device will include a second electrode which may, optionally, also be an electrode according to the present invention. One electrode will act as anode where oxidation will occur, the other electrode will act as cathode where reduction will occur.

Such a device will therefore employ a substance to be oxidized (for example $H_2$ in a fuel cell or $H_2O$ in an electrolysis device) and a substance to be reduced (for example $O_2$ in a fuel cell or $H_2O$ or $CO_2$ in an electrolysis device). In an electrolysis device, the oxidation-reduction reaction will be forced, that is to say, caused by the applied electric current. In the fuel cell, the oxidation-reduction reaction will be spontaneous, allowing the generation of electrical energy.

Such devices will include in particular other elements well known to the person skilled in the field of electrochemistry, such as one or more other electrodes (in particular a potential reference electrode), an energy source, a membrane, a supporting salt, a device allowing the flow of reagents, a device for collecting the gases formed, etc. However, the skilled person knows perfectly well how to make and implement such an electrochemical device.

The electrochemical device according to the present invention will advantageously be an electrolysis device. Advantageously, this device will use the electrode according to the present invention as anode, in particular to oxidize water to dioxygen according to the following reaction:

$$2H_2O\rightarrow O_2+4H^++4e^-$$

An exemplary water electrolysis device is shown in FIG. 6.

The present invention also has as a fourth object a process for oxidizing water to dioxygen comprising the application of electric current between an anode and a cathode, the anode being an electrode according to the invention immersed in water or in a fluid containing water.

Within the meaning of the invention, "immersed" in a fluid means that the electrode is plunged into the fluid at least partially. In the case of the electrode according to the invention, the part of the electrode covered with the metal deposit, the surface of which is oxidized, sulphurized, selenized and/or tellurized, must be at least partially plunged into the fluid.

In such a process, the anode, corresponding to an electrode according to the present invention, will be immersed preferably in water, and more particularly in water having a basic pH (between 7 and 14, preferentially between 10 and 14), obtained for example by adding soda.

The cathode may also be immersed in the same fluid or may be immersed in another fluid. $CO_2$ may be added to this fluid by bubbling or pressurizing the medium. If the anode and cathode are not immersed in the same fluid, these two fluids may be separated for example by an ion (e.g. proton) exchange, osmotic or dialysis membrane in order to allow charges or solvent molecules to pass from one fluid to another.

The cathode may be any electrode traditionally used in the art as cathode and with which the skilled person is well familiar. Such a cathode may be for example platinum, cobalt, copper, etc.

When a current is applied between the anode and the cathode, the water will be oxidized to dioxygen at the anode according to the following reaction:

$$2H_2O\rightarrow O_2+4H^++4e^-$$

thus allowing the production of oxygen at the anode.

The current applied between the two electrodes will notably have a potential difference comprised between 1.2 V and 10 V, in particular comprised between 1.4 V and 4 V.

The use of an electrode according to the invention makes it possible to carry out this oxidation reaction of water to dioxygen with an overvoltage of less than 350 mV, or even less than 300 mV, for a current density of 10 mA/cm² or even less than 550 mV, which may go up to at least 450 mV, for a current density of 100 mA/cm². In the case of a copper/ copper oxide electrode according to the invention, this reaction may be carried out with an overvoltage of 340 mV or even of 290 mV for a current density of 10 mA/cm$^2$; or of 530 mV or even of 450 mV for a current density of 100 mA/cm$^2$.

The electrode according to the invention thus makes it possible to efficiently carry out the oxidation reaction of water to dioxygen, while having a low-cost catalytic system.

An exemplary process according to the invention is shown in FIG. 6.

The present invention is illustrated by the figures and the non-limiting examples below.

FIGURES

EXAMPLES

General Considerations

Figure 1:
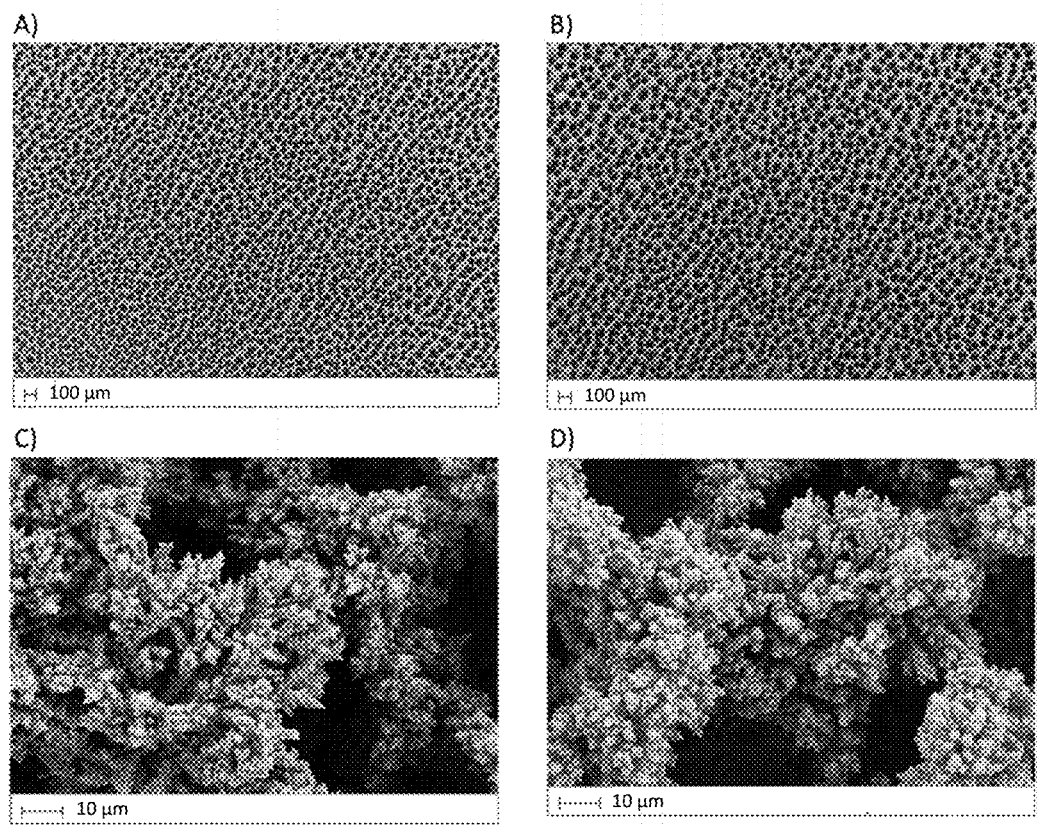
FIGS. 1A to 1D show scanning electron microscopy (SEM) images of the Cu/Cu$_x$O$_y$ electrodes obtained in example 1 (FIGS. 1A and 1C) and the Cu/Cu$_x$S$_y$ electrodes obtained in example 2 (FIGS. 1B and 1D).

The electrocatalytic measurements and the electrolysis experiments are performed in a three-electrode, two-compartment cell, allowing separation of gas phase products in the anodic and cathodic compartments using a Bio-Logic SP300 potentiostat. An Ag/AgCl reference electrode is placed in the same compartment as the working electrode. A platinum counter electrode is placed in a separate compartment connected by a porosity 5 sintered glass filled with the electrolyte solution. The potentials are referenced to the reversible hydrogen electrode (RHE) using the equation below:

$$E_{RNE}=E_{Ag/AgCl}+0.197+0.059*pH$$

The result of linear scanning voltammetry is not compensated for the ohmic drop. The faradaic yield was obtained by comparing the theoretical amount of oxygen produced on the basis of the charge consumed with the amount of oxygen determined by gas chromatography. The scanning electron microscopy (SEM) images were acquired using a Hitachi S-4800 scanning electron microscope. The images of X-ray powder diffraction of patterns were recorded using an analytical X'Pert Pro P diffractometer provided with a Cu-Ka radiation source (λKα1=1.540598 Å, λKα2=1.544426 nm) or a Co-Ka radiation source (λKα1=1.78897 Å, λKα2=1.79285 Å) with an X'Celerator detector. Gas chromatography was performed on a Shimadzu GC-2014 chromatograph equipped with a Quadrex Molsieve 5A plot column, a thermal conductivity detector and using He as carrier gas (30 ml/min). To prepare the electrode, the surface of the Cu plate (3 cm×1 cm) was cleaned using sandpaper (p 1200) followed by immersion in a 5.0M HCl solution for 30 s. The plate is then rinsed with ethanol before being air-dried. The Randles-Sevcik equation (1) is used to calculate $\lambda_{\text{diff}}$, the electroactive surface area of the electrode:

$$i_p=2.69\times10^5 n^{3/2} D^{1/2} A_{\text{diff}} C v^{1/2} \tag{1}$$

The current $i_p$ is the peak current corresponding to the reduction of the redox pair (Fe$^{3+}$/Fe$^{2+}$), determined by cyclic voltammetry of K$_3$[Fe(CN)$_6$], n is the number of electrons exchanged, D is the diffusion coefficient of the analyte (7.5×10$^{-6}$ cm$^2 \cdot$s$^{-1}$ for K$_3$[Fe(CN)$_6$]), C (mol·cm$^{-3}$) is the molar concentration in the analyte and v is the scanning rate (V·s$^{-1}$). The electroactive surface area of the electrodes is measured using an electrode of 1 cm$^2$ geometric surface area plunged into a solution containing 5 mM K$_3$[Fe(CN)$_6$] and 0.1 M pH 7.0 phosphate buffer. Application of equation (1) then allows the determination of the electroactive surface area value A$_{\text{diff}}$, and consequently the specific surface area determined by electrochemistry by dividing this value by the geometric surface area of the electrode according to the relationship: Specific surface area determined by electrochemistry=A$_{\text{diff}}$/A$_{\text{geometric}}$ (in cm$^2$/cm$^2_{\text{geometric}}$). The samples used for the BET measurements were obtained by mechanical abrasion, using a 1 mm thick PVC (poly(vinyl chloride)) blade, of the metal deposit present on the substrate.

Figure 2:
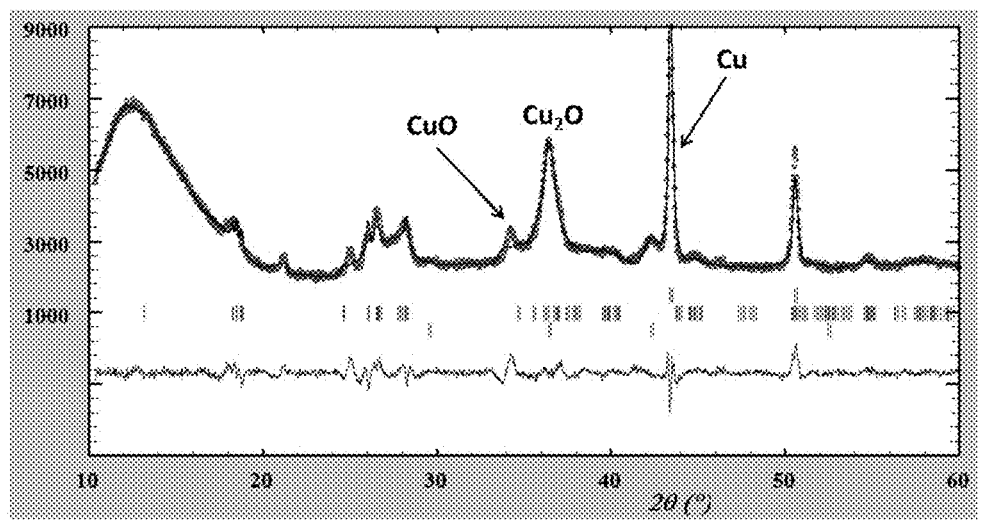
FIG. 2 shows the X-ray powder diffractogram of the Cu/Cu$_x$O$_y$ electrode obtained in example 1.
Figure 3:
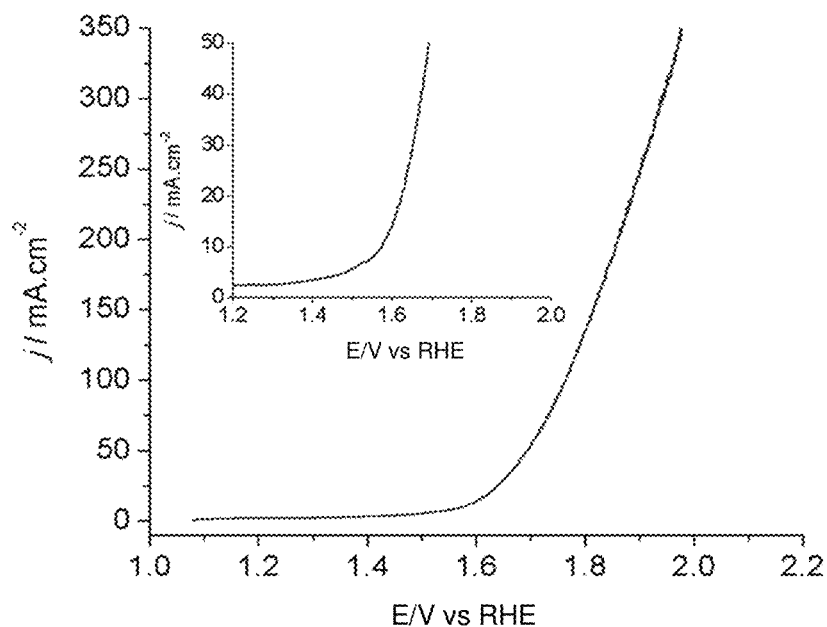
FIGS. 3A and 3B show, respectively, the linear scan voltammetry (A) and the Tafel plot (B) of the Cu/Cu$_x$O$_y$ electrode obtained in example 1 in a 1.0 M NaOH aqueous solution.
Figure 3:
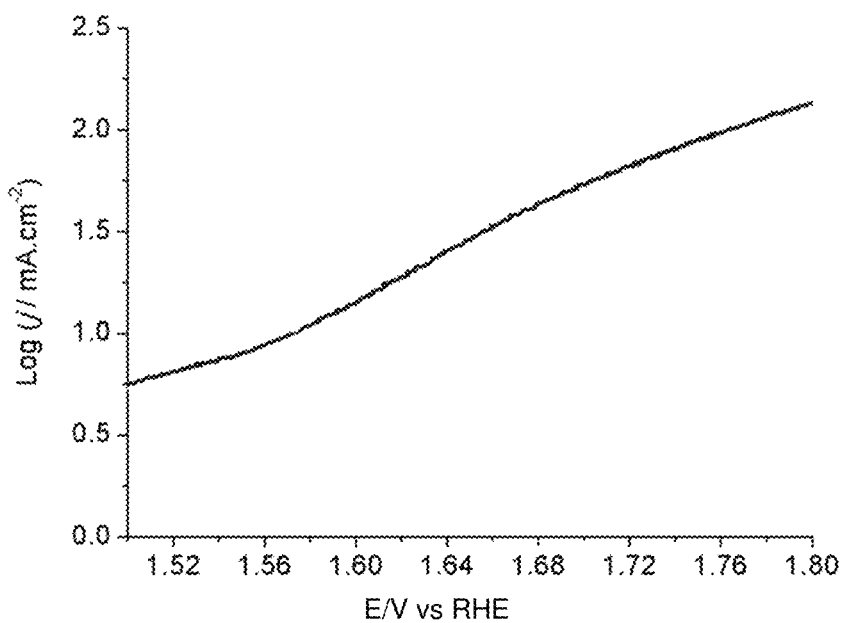

Example 1: Preparation of a Copper/Copper Oxide Electrode According to the Invention on Copper Substrate 1 cm$^2$ of a freshly cleaned copper plate is immersed in 20 ml of a 0.2 M CuSO$_4$, 1.5 M H$_2$SO$_4$ solution and a current of 0.5 A is applied using a galvanostatic method for a period of 80 s. The electrode is then removed from the solution and cleaned with large amounts of distilled water and dried under vacuum (10 mbar). The electrode is then transferred to an oven under static air atmosphere (1 bar). The temperature is raised to 310° C. at a rate of 10° C. per minute, and the temperature is kept constant for 1 hour. After this step, the electrode is cooled to room temperature and stored in air. This electrode is subsequently named Cu/Cu$_x$O$_y$ electrode. FIGS. 1A and 1C show SEM images of this electrode and illustrate the porous nanostructures and the high specific surface area of the material. The X-ray powder diffractogram of this electrode is presented in FIG. 2 and shows the presence of Cu, Cu$_2$O and CuO. Linear scanning voltammetry between 1.2V and 2.0V vs RHE (Reversible Hydrogen Electrode) in 1.0M NaOH aqueous solution with a scanning rate of 10 mV/s is presented in FIG. 3A. A current density of 10 mA·cm$^{-2}$ was obtained at 340 mV overvoltage for the production of dioxygen. The Tafel plot of the electrode is presented in FIG. 3B. Catalytic activity increases linearly from 1.56V to 1.66V vs RHE. The Tafel slope was determined in this region to be equal to 38 mV·dec$^{-1}$. The specific surface area determined electrochemically is 19.6 cm$^2$/cm$^2_{geometric}$. The specific surface area determined by BET is 3.4 m$^2$/g.

Figure 4:
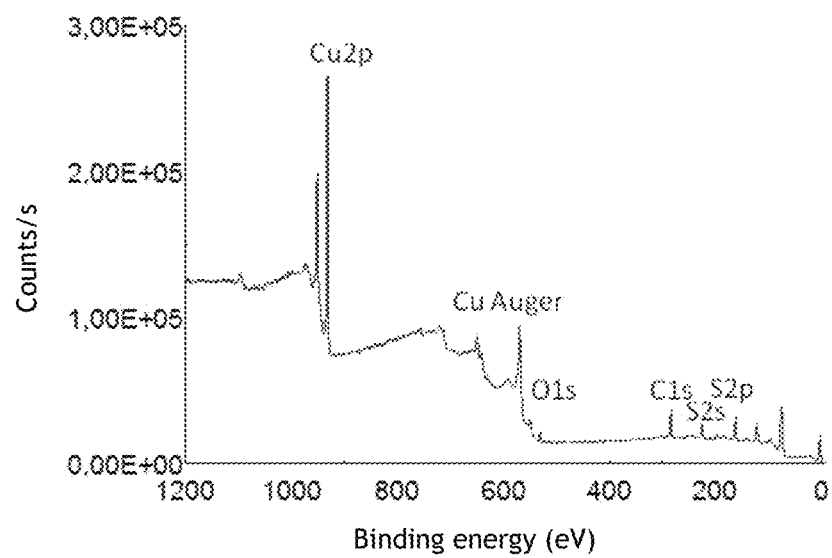
FIGS. 4A and 4B show the wide spectrum (A) and the high-resolution spectrum centred on sulphur (B) obtained by X-ray photoelectron spectroscopy of the Cu/Cu$_x$S$_y$ electrode obtained in example 2.
Figure 4:
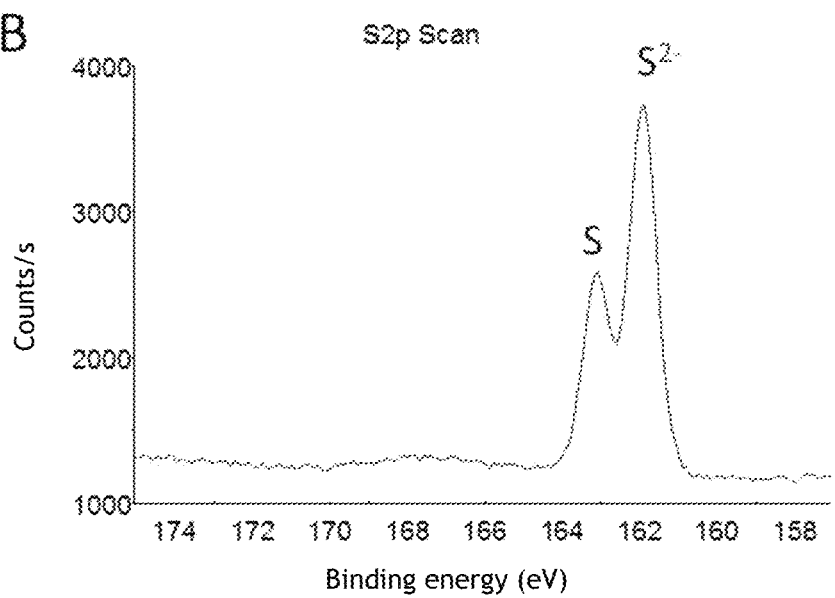
Figure 5:
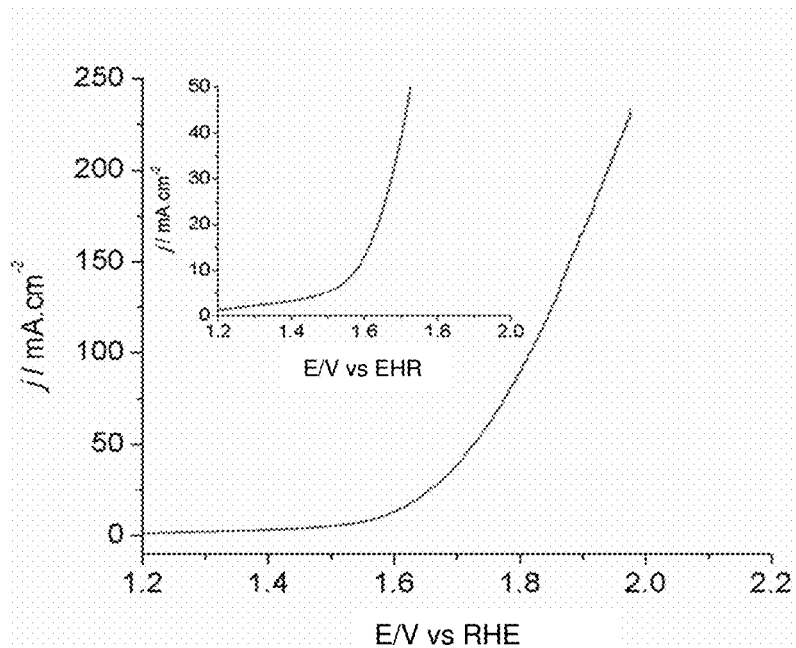
FIGS. 5A and 5B show, respectively, the linear scan voltammetry (A) and the Tafel plot (B) of the Cu/Cu$_x$S$_y$ electrode obtained in example 2 in a 1.0 M NaOH aqueous solution.
Figure 5:
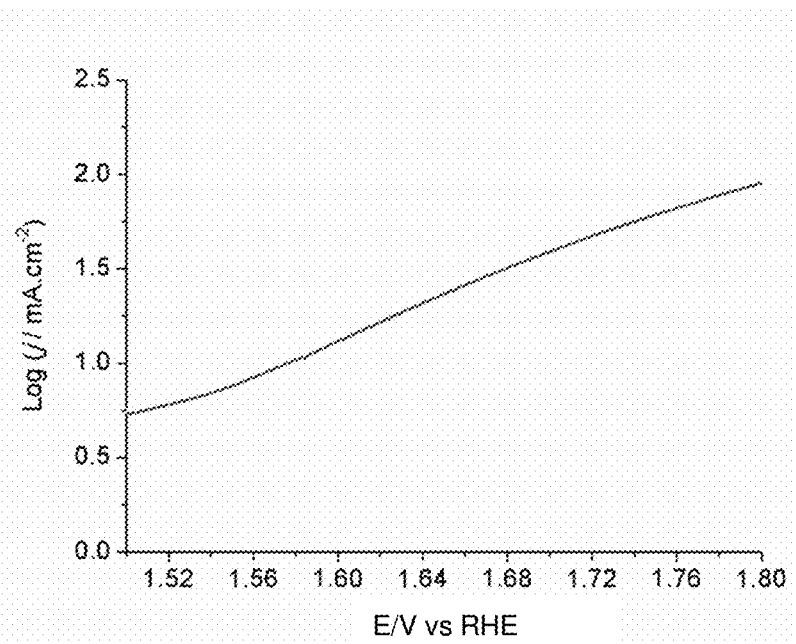
Figure 6:
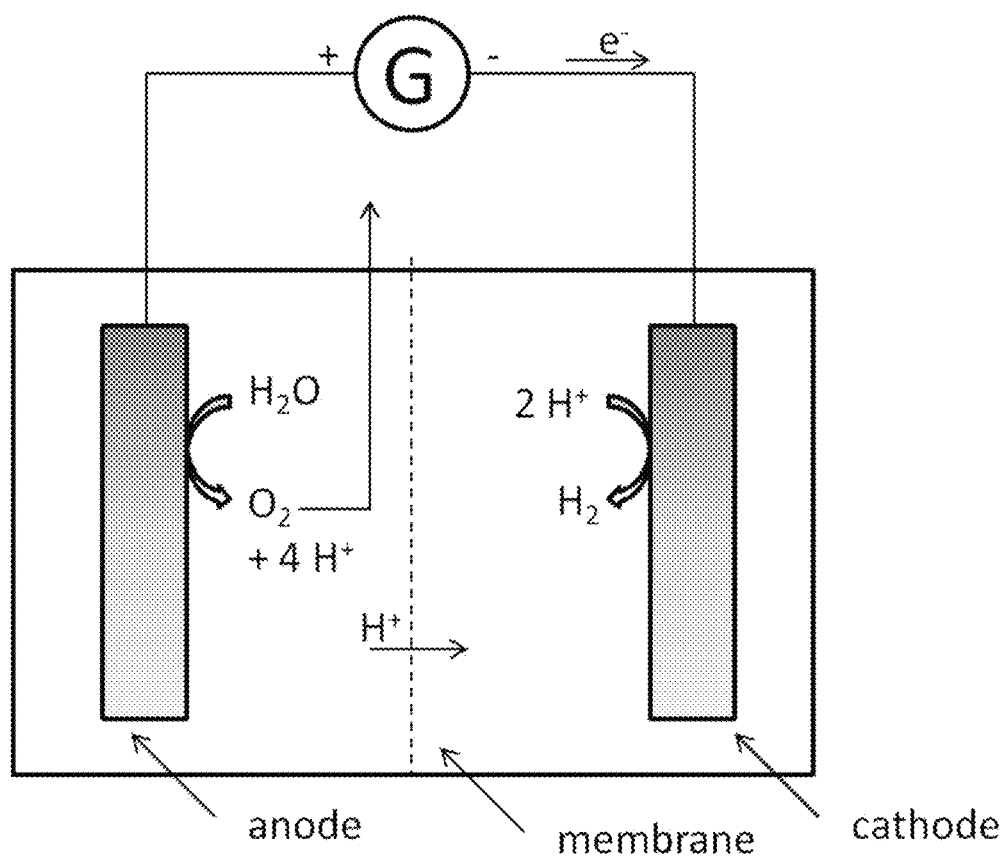
FIG. 6 illustrates a water electrolysis process/device in which water is oxidized to dioxygen at the anode which is an electrode according to the present invention.

Example 2: Preparation of a Copper/Copper Sulphide Electrode According to the Invention on Copper Substrate 1 cm$^2$ of a freshly cleaned copper plate is immersed in 20 ml of a 0.2 M CuSO$_4$, 1.5 M H$_2$SO$_4$ solution and a current of 0.5 A is applied using a galvanostatic method for a period of 80 s. The electrode is then removed from the solution and cleaned with large amounts of distilled water and dried under vacuum (10 mbar). The electrode is then transferred to a glass reactor containing 15 mg of elemental sulphur powder in a compartment separated from but connected to the rest of the reactor where the electrode is located. Vacuum (0.01 mbar) is created in the reactor (including in the compartment containing elemental sulphur), which is kept under static vacuum and placed in an oven. The temperature of the whole is raised to 150° C. at a rate of 15° C. per minute, and the temperature is maintained at 150° C. for 2 minutes. After this step, the reactor is removed from the oven and allowed to cool to room temperature, all while creating vacuum in the reactor (dynamic vacuum). After cooling to room temperature, the compartment containing elemental sulphur is disconnected from the reactor containing the electrode and the reactor containing the electrode is placed in the oven again, all while creating vacuum (dynamic vacuum—0.01 mbar). The oven temperature is raised to 150° C. at a rate of 15° C. per minute, and the temperature is maintained at 150° C. for 1 h. After this annealing step, the electrode is cooled to room temperature under dynamic vacuum and used quickly after its preparation. This electrode is subsequently named Cu/Cu$_x$S$_y$ electrode. FIGS. 1B and 1D show SEM images of this electrode and illustrate the porous nanostructures and the high specific surface area of the material. The spectrum obtained by X-ray photoelectron spectroscopy of this electrode is presented in FIG. 4 and reveals the presence of copper and copper sulphide. Linear scanning voltammetry between 1.2V and 2.0V vs RHE in 1.0M NaOH aqueous solution with a scanning rate of 10 mV/s is presented in FIG. 5A. A current density of 10 mA·cm$^{-2}$ was obtained at 340 mV overvoltage for the production of dioxygen. The Tafel plot of the electrode is presented in FIG. 5B. Catalytic activity increases linearly from 1.56V to 1.66V vs RHE. The Tafel slope was determined in this region to be equal to 40 mV·dec$^{-1}$.

The specific surface area determined electrochemically is 23.0 cm$^2$/cm$^2_{geometric}$. The specific surface area determined by BET is 3.8 m$^2$/g.

Example 3: Measurement of Catalytic Activity for Water Oxidation of the Cu/Cu$_x$O$_y$ Electrode Water electrolysis is carried out with a fixed applied overvoltage of 400 mV using the Cu/Cu$_x$O$_y$ electrode as working electrode in a 1.0 M NaOH aqueous solution. The generation of a large amount of oxygen gas is observed at the electrode. The oxygen produced is quantified by gas chromatography. After 10 minutes of electrolysis, the faradaic yield for O$_2$ evolution is estimated at 89% (2.2 C consumed, 5.14 µmol O$_2$ generated, 0.5 cm$^2$ electrode plunging into the solution).

Example 4: Measurement of Catalytic Activity for Water Oxidation of the Cu/Cu$_x$S$_y$ Electrode Water electrolysis is carried out with a fixed applied overvoltage of 400 mV using the Cu/Cu$_x$S$_y$ electrode as working electrode in a 1.0 M NaOH aqueous solution. The generation of a large amount of oxygen gas is observed at the electrode. The oxygen produced is quantified by gas chromatography. After 10 minutes of electrolysis, the faradaic yield for O$_2$ evolution is estimated at 92% (2.0 C consumed, 4.83 µmol O$_2$ generated, 0.5 cm$^2$ electrode plunging into the solution).

Example 5: Durability of the Cu/Cu$_x$O$_y$ Electrode Under Catalytic Conditions Water electrolysis is carried out with a fixed applied overvoltage of 600 mV using the Cu/Cu$_x$O$_y$ electrode as working electrode in a 0.1 M NaOH aqueous solution. Throughout the duration of the experiment (4 h), a large amount of oxygen gas is constantly generated. No sign of deactivation is observed, a stable current density of 20 mA/cm$^2$ being observed throughout the experiment.

Example 6: Preparation of a Copper/Copper Oxide Electrode According to the Invention on Copper Substrate 1 cm$^2$ of a freshly cleaned copper plate is immersed in 20 ml of a 0.2 M CuSO$_4$, 1.5 M H$_2$SO$_4$ solution and a current of 0.5 A is applied using a galvanostatic method for a period of 80 s. The electrode is then removed from the solution and cleaned with large amounts of distilled water and dried under vacuum (10 mbar). The electrode is then transferred to an oven under static air atmosphere (1 bar). The temperature is raised to 310° C. at a rate of 10° C. per minute, and the temperature is kept constant for 1 hour. After this step, the electrode is cooled to room temperature. The electrode thus prepared is then plunged into a solution of Cu(imidazole)$_2$Cl$_2$ (0.2 mM) in an acetonitrile/3% water (v/v) mixture also containing 0.1 M supporting salt TBAPF$_6$ (tetrabutylammonium hexafluorophosphate). The electrode is then subjected to two cycles of cyclic voltammetry between −0.5 V and 1 V (vs Ag/AgCl) and a cycle rate of 50 mV/s. The electrode thus obtained is removed from the solution and cleaned with large amounts of distilled water and air-dried at room temperature.

This electrode is subsequently named Cu/Cu$_x$O$_y$/CuO NP electrode.

Figure 7:
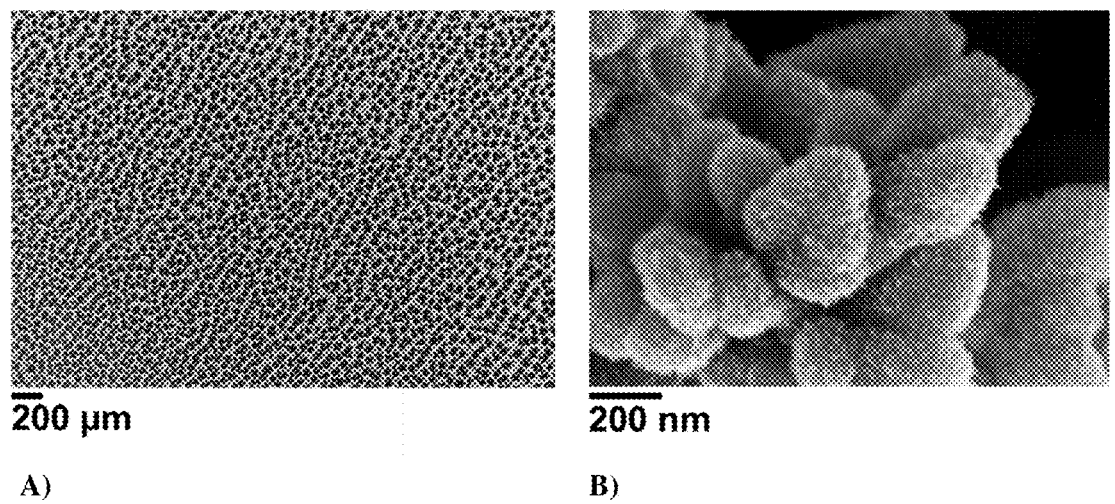
FIGS. 7A and 7B show scanning electron microscopy (SEM) images of the Cu/Cu$_x$O$_y$/CuO NP electrode obtained in example 6.
Figure 8:
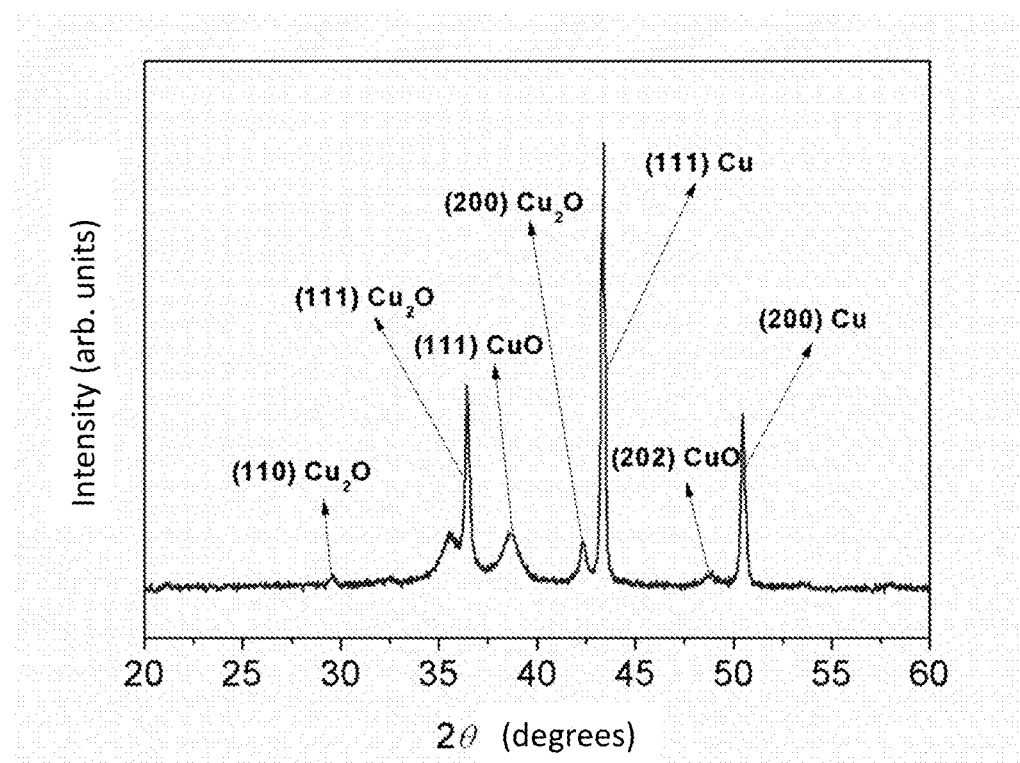
FIG. 8 shows the X-ray powder diffractogram of the Cu/Cu$_x$O$_y$/CuO NP electrode obtained in example 6.
Figure 9:
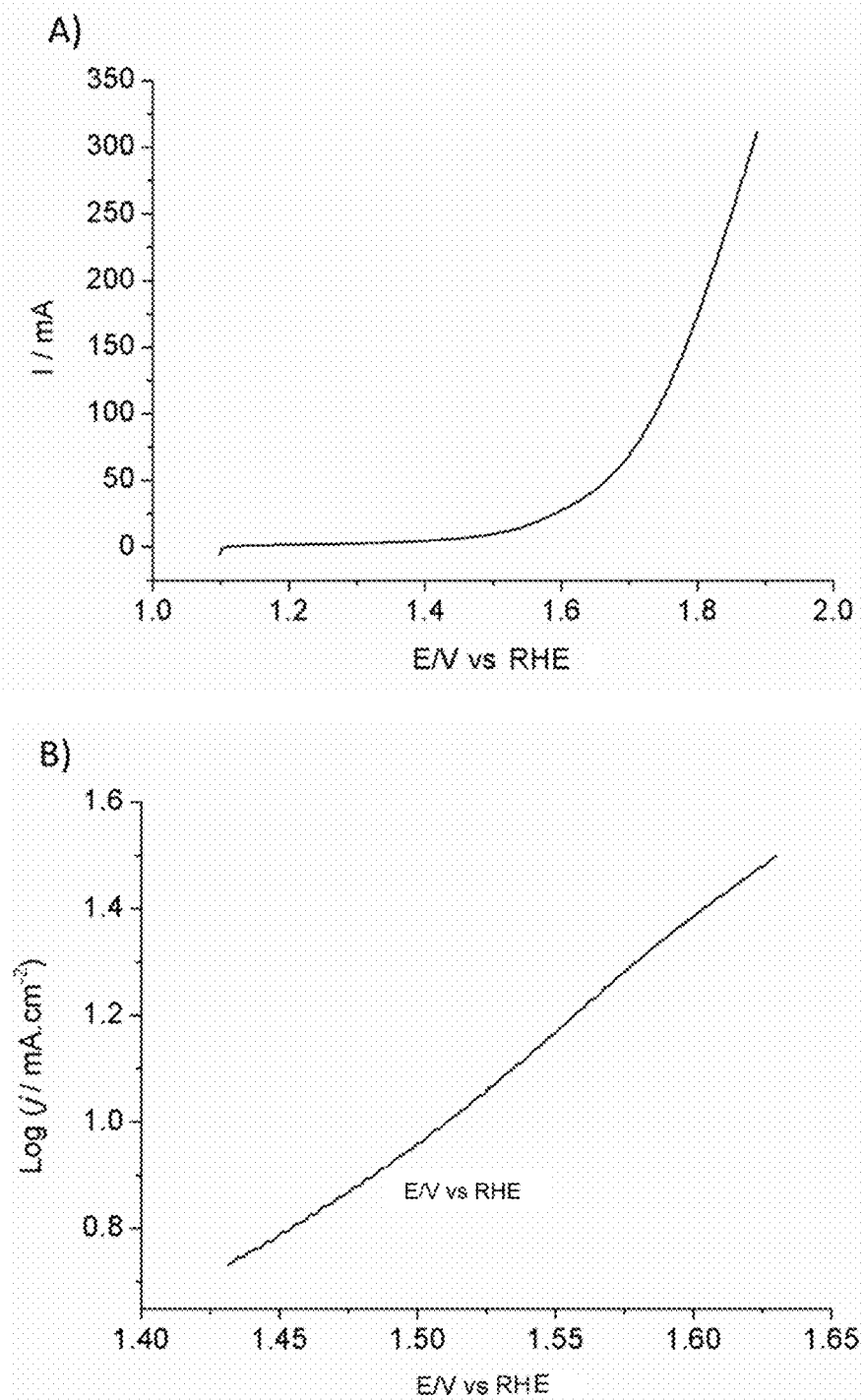
FIGS. 9A and 9B show, respectively, the linear scan voltammetry (A) and the Tafel plot (B) of the Cu/Cu$_x$O$_y$/CuO NP electrode obtained in example 6 in a 1.0 M KOH aqueous solution.

FIG. 7 shows SEM images of this electrode and illustrates the porous nanostructures and the high specific surface area of the material. The X-ray powder diffractogram of this electrode is presented in FIG. 8 and shows the presence of Cu, $Cu_2O$ and CuO. Linear scanning voltammetry between 1.2V and 2.0V vs RHE (Reversible Hydrogen Electrode) in a 1.0M KOH aqueous solution with a scanning rate of 10 mV/s is presented in FIG. 9A. A current density of 10 mA·cm$^{-2}$ was obtained at 290 mV overvoltage for the production of dioxygen. The Tafel plot of the electrode is presented in FIG. 9B. Catalytic activity increases linearly from 1.56V to 1.66V vs RHE. The Tafel slope was determined in this region to be equal to 64 mV·dec$^{-1}$. The specific surface area determined electrochemically is 20.6 cm$^2$/cm$^2_{geometric}$.

Figure 13:
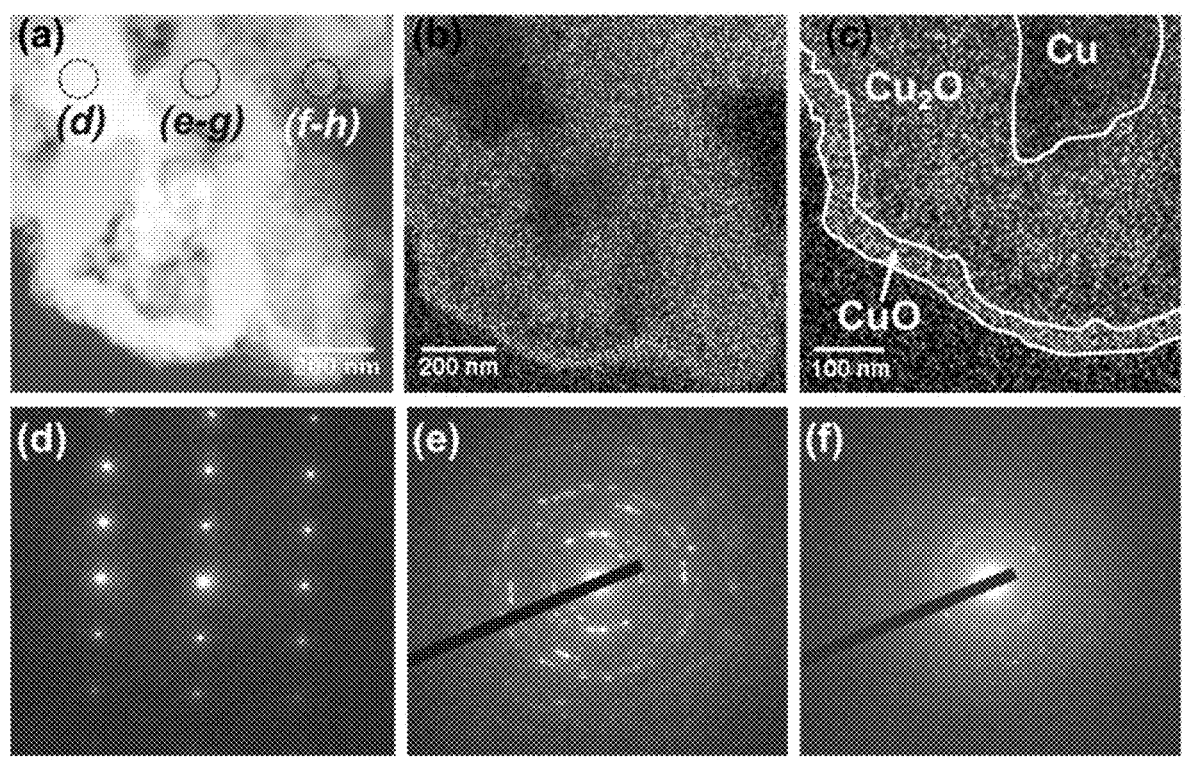
FIG. 13 shows TEM images of an electrode section made by focused ion beam: (a) STEM–HAADF image indicating by circles the areas where the SAED images were measured (b)(c) STEM-XEDS analyses (Cu in dark grey, O in light grey) (Cu in green and O in red on the original colour image) (d)(e)(f) SAED images of the areas indicated in (a).
Figure 13:
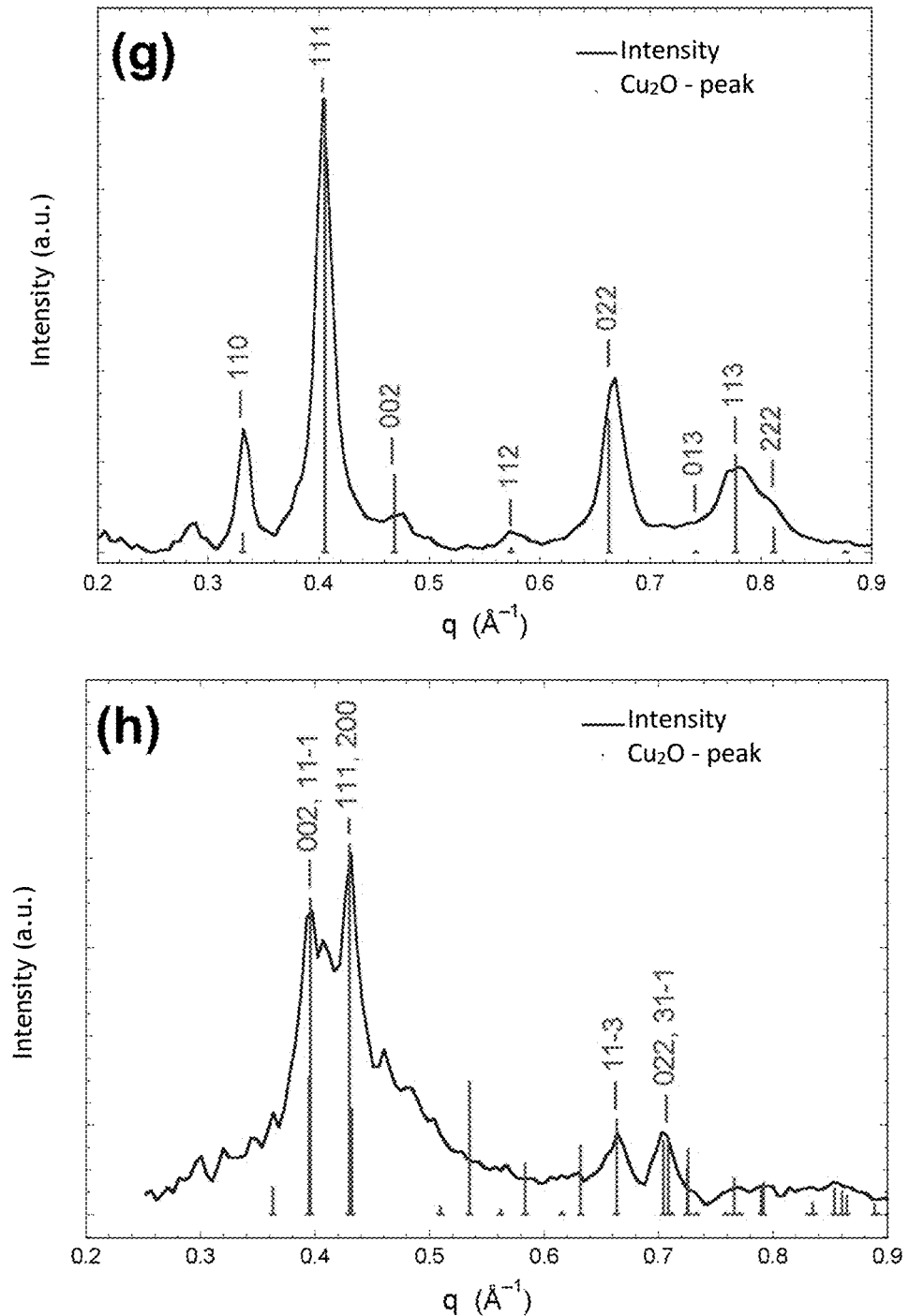

FIG. 13 shows TEM images of an electrode section made by focused ion beam: (a) STEM–HAADF (Scanning Transmission Electron Microscope/High-Angle Annular Dark-Field) image indicating the areas where the SAED (Selected Area Electron Diffraction) images were measured by circles (b)(c) STEM-XEDS (Scanning Transmission Electron Microscope/X-Ray Energy-Dispersive Spectroscopy) analyses (Cu in dark grey, O in light grey) (Cu in green and O in red on the original colour image) (d)(e)(f) SAED images of the areas indicated in (a) showing the presence of copper metal, $Cu_2O$ (area (e)) or CuO (area(f)).

The same example was carried out while replacing the supporting salt $TBAPF_6$ (tetrabutylammonium hexafluorophosphate) with $TBABF_4$ (tetrabutylammonium tetrafluoroborate).

Example 7: Preparation of a Copper/Copper Oxide Electrode According to the Invention on an FTO Substrate 1 cm$^2$ of a layer of FTO deposited on a freshly cleaned glass slide is immersed in 20 ml of a 0.2 M $CuSO_4$, 1.5 M $H_2SO_4$ solution and a current of 0.5 A is applied using a galvanostatic method for a period of 80 s. The electrode is then removed from the solution and cleaned with large amounts of distilled water and dried under vacuum (10 mbar). The electrode is then transferred to an oven under static air atmosphere (1 bar). The temperature is raised to 310° C. at a rate of 10° C. per minute, and the temperature is kept constant for 1 hour. After this step, the electrode is cooled to room temperature. This electrode is subsequently named Cu/Cu$_x$O$_y$ (FTO) electrode.

Figure 10:
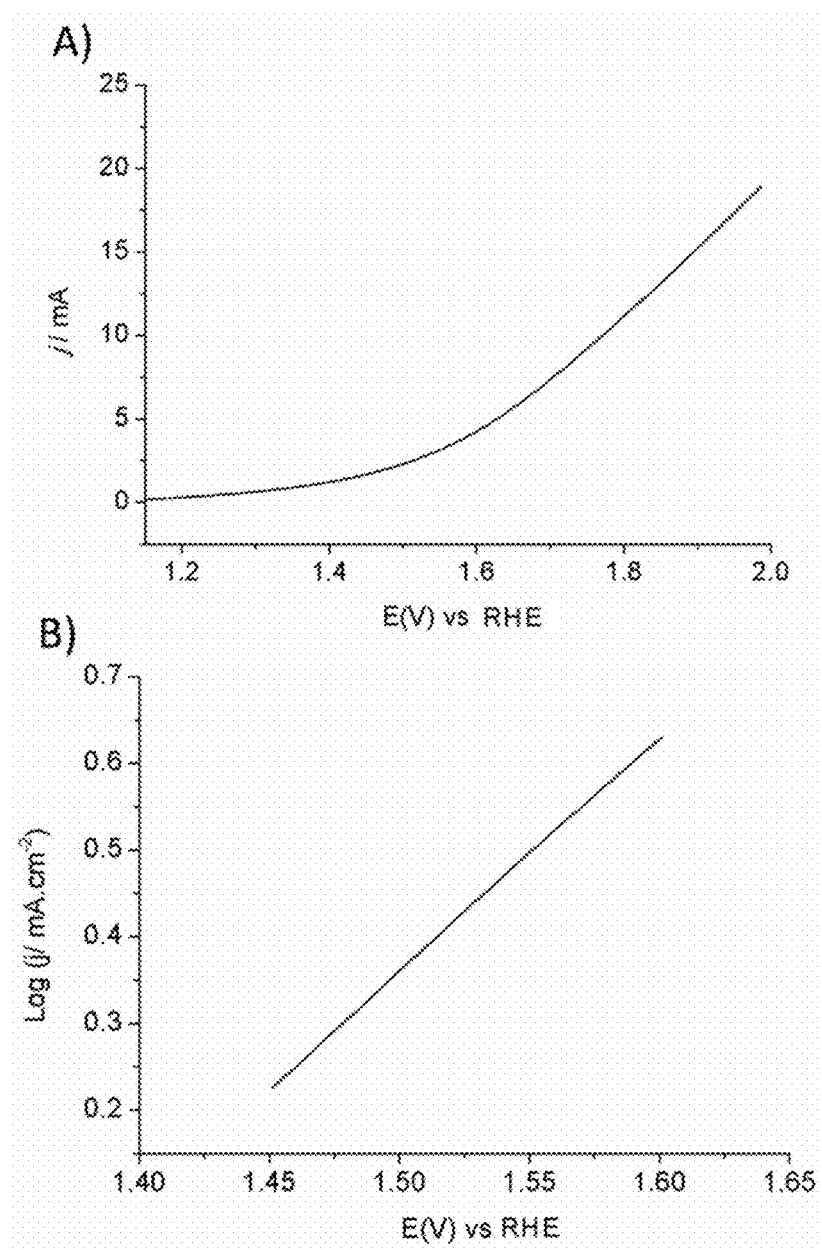
FIGS. 10A and 10B show, respectively, the linear scan voltammetry (A) and the Tafel plot (B) of the Cu/Cu$_x$O$_y$ (FTO) electrode obtained in example 7 in a 1.0 M KOH aqueous solution.

Linear scanning voltammetry between 1.2V and 2.0V vs RHE (Reversible Hydrogen Electrode) in a 1.0M KOH aqueous solution with a scanning rate of 10 mV/s is presented in FIG. 10A. A current density of 10 mA·cm$^{-2}$ was obtained at 540 mV overvoltage for the production of dioxygen. The Tafel plot of the electrode is presented in FIG. 10B. Catalytic activity increases linearly from 1.45V to 1.6V vs RHE. The Tafel slope was determined in this region to be equal to 121 mV·dec$^{-1}$.

Figure 11:
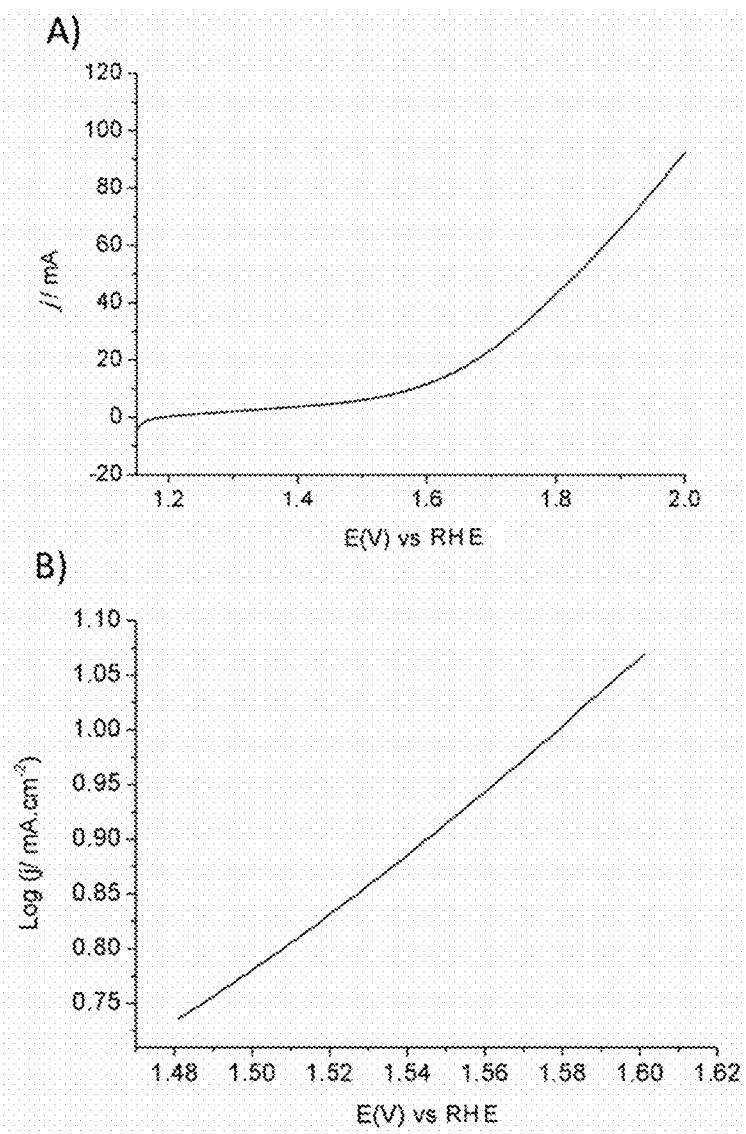
FIGS. 11A and 11B show, respectively, the linear scan voltammetry (A) and the Tafel plot (B) of the Cu/Cu$_x$O$_y$ (FC) electrode obtained in example 8 in a 1.0 M KOH aqueous solution.

Example 8: Preparation of a Copper/Copper Oxide Electrode According to the Invention on a Carbon Felt Substrate 1 cm$^2$ of freshly cleaned carbon felt is immersed in 20 ml of a 0.2 M $CuSO_4$, 1.5 M $H_2SO_4$ solution and a current of 0.5 A is applied using a galvanostatic method for a period of 80 s. The electrode is then removed from the solution and cleaned with large amounts of distilled water and dried under vacuum (10 mbar). The electrode is then transferred to an oven under static air atmosphere (1 bar). The temperature is raised to 310° C. at a rate of 10° C. per minute, and the temperature is kept constant for 1 hour. After this step, the electrode is cooled to room temperature. This electrode is subsequently named Cu/Cu$_x$O$_y$ (FC) electrode. Linear scanning voltammetry between 1.2V and 2.0V vs RHE (Reversible Hydrogen Electrode) in a 1.0M KOH aqueous solution with a scanning rate of 10 mV/s is presented in FIG. 11A. A current density of 10 mA·cm$^{-2}$ was obtained at 350 mV overvoltage for the production of dioxygen. The Tafel plot of the electrode is presented in FIG. 11B. Catalytic activity increases linearly from 1.48V to 1.61V vs RHE. The Tafel slope was determined in this region to be equal to 84 mV·dec$^{-1}$.

Figure 12:
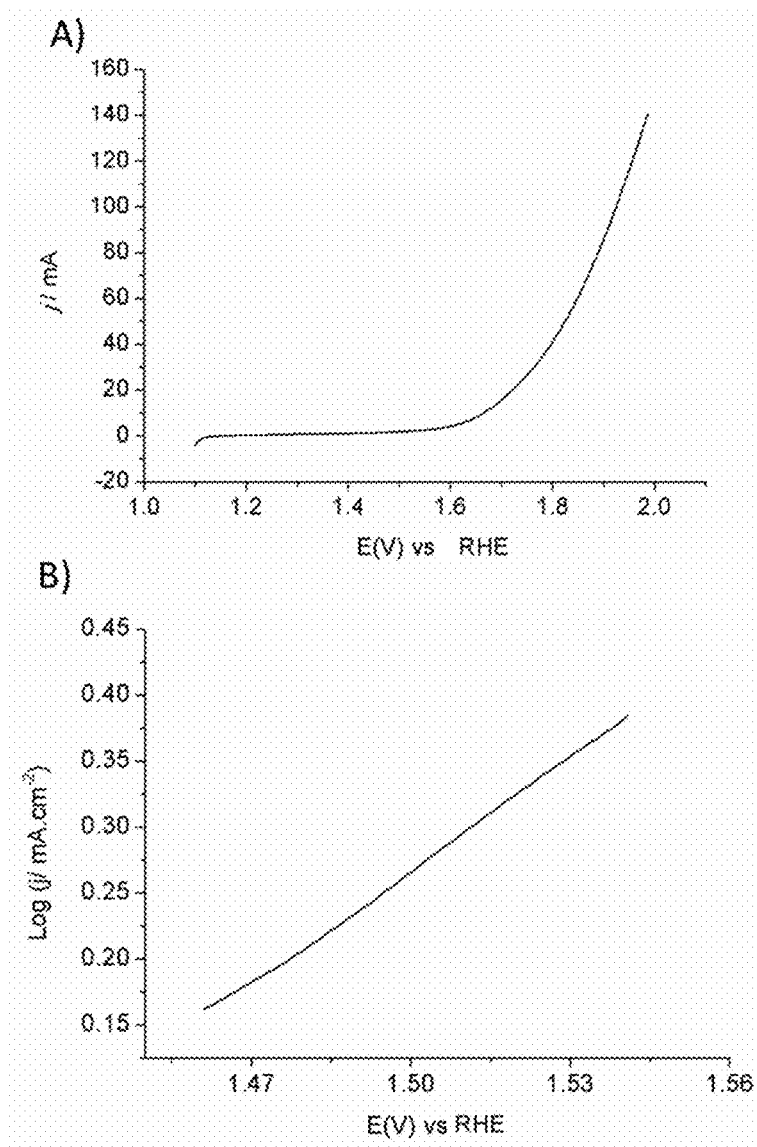
FIGS. 12A and 12B show, respectively, the linear scan voltammetry (A) and the Tafel plot (B) of the Cu/Cu$_x$O$_y$ (Ti) electrode obtained in example 9 in a 1.0 M KOH aqueous solution.

Example 9: Preparation of a Copper/Copper Oxide Electrode According to the Invention on a Titanium Substrate 1 cm$^2$ of freshly cleaned titanium plate is immersed in 20 ml of a 0.2 M $CuSO_4$, 1.5 M $H_2SO_4$ solution and a current of 0.5 A is applied using a galvanostatic method for a period of 80 s. The electrode is then removed from the solution and cleaned with large amounts of distilled water and dried under vacuum (10 mbar). The electrode is then transferred to an oven under static air atmosphere (1 bar). The temperature is raised to 310° C. at a rate of 10° C. per minute, and the temperature is kept constant for 1 hour. After this step, the electrode is cooled to room temperature. This electrode is subsequently named Cu/Cu$_x$O$_y$ (Ti) electrode. Linear scanning voltammetry between 1.2V and 2.0V vs RHE (Reversible Hydrogen Electrode) in a 1.0M KOH aqueous solution with a scanning rate of 10 mV/s is presented in FIG. 12A. A current density of 10 mA·cm$^{-2}$ was obtained at 410 mV overvoltage for the production of dioxygen. The Tafel plot of the electrode is presented in FIG. 12B. Catalytic activity increases linearly from 1.45V to 1.55V vs RHE. The Tafel slope was determined in this region to be equal to 89 mV·dec$^{-1}$.

REFERENCES

Du et al. *Angew. Chem.* 2015, 2073
Kanan et al *Science* 2008, 1072
Liu et al (a) *J. Phys. Chem. C* 2016, 831; (b) *Electrochim. Acta* 2016, 381
Nocera *Acc. Chem. Res.* 2012, 76

The invention claimed is:

1. An electrode comprising an electrically conductive substrate having a surface, wherein at least one part of the surface of the electrically conductive substrate is covered with a porous copper metal deposit, wherein the surface of the porous copper metal deposit is oxidized,
   wherein the porous copper metal deposit has a specific surface area greater than or equal to 1 m$^2$/g and greater than or equal to 15 cm$^2$/cm$^2_{geometric}$, and an average pore size of between 10 μm and 500 μm,
   wherein the oxidized surface of the porous copper metal deposit is obtained by oxidizing the surface of the porous copper metal deposit at a temperature comprised between 100° C. and 400° C., and
   wherein copper oxide is optionally deposited on the oxidized surface of the porous copper metal deposit.

2. The electrode according to claim 1, wherein the metal deposit has a thickness comprised between 10 μm and 2 mm.

3. The electrode according to claim 1, wherein the average pore size is between 30 μm and 70 μm.

4. The electrode according to claim 1, wherein the electrically conductive substrate consists, at least in part, of an electrically conductive material selected from a metal; a metal oxide; a metal sulphide; carbon; a semiconductor; and a mixture thereof.

5. The electrode according to claim 4, wherein the metal is copper, steel, aluminium, or zinc; the metal oxide is fluorine-doped tin oxide (FTO) or indium tin oxide (ITO); the metal sulphide is cadmium sulphide or zinc sulphide; the carbon is in the form of carbon felt, graphite, vitreous carbon, or boron-doped diamond; and the semiconductor is silicon.

6. The electrode according to claim 1, wherein the metal deposit has a specific surface area comprised between 1 $m^2/g$ and 500 $m^2/g$.

7. The electrode according to claim 6, wherein the metal deposit has a specific surface area comprised between 3 $m^2/g$ and 50 $m^2/g$.

8. The electrode according to claim 1, wherein the metal deposit has a specific surface area of between 15/$cm^2$, $cm^2_{geometric}$ and 50 $cm^2/cm^2_{geometric}$.

9. An electrochemical device comprising an electrode according to claim 1.

10. The electrochemical device according to claim 9, being an electrolysis device or a fuel cell.

11. An electrode obtainable by a process comprising the following successive steps:
   (i) electrodepositing copper on at least one part of the surface of an electrically conductive substrate so as to form a copper metal deposit on the at least one part of the surface of the electrically conductive substrate, the copper metal deposit having a surface,
   (ii) oxidizing the surface of the copper metal deposit at a temperature comprised between 100° C. and 400° C. to form an oxidized surface, and
   (iii) optionally depositing copper oxide on the oxidized surface of the copper metal deposit.

12. An electrochemical device comprising an electrode according to claim 11.

13. A process for preparing an electrode according to claim 1 comprising the following successive steps:
   (i) electrodepositing copper on at least one part of the surface of the electrically conductive substrate so as to form a copper metal deposit the at least one part of the surface of the electrically conductive substrate,
   (ii) oxidizing the surface of the copper metal deposit at a temperature between 100° C. and 400° C., and
   (iii) optionally depositing copper oxide on the oxidized surface of the copper metal deposit.

14. The process according to claim 13, wherein the step (i) comprises the following successive steps:
   (a) immersing at least partially the electrically conductive substrate in an acidic aqueous solution containing ions of the copper to be deposited, and
   (b) applying a current between the electrically conductive substrate and a second electrode.

15. The process according to claim 13, wherein the step (iii) comprises the following successive steps:
   (1) immersing at least the part of the electrically conductive substrate covered with the copper metal deposit, the surface of which is oxidized, obtained in the step (ii) in a solution containing copper ions, and
   (2) applying a potential between the electrically conductive substrate and a second electrode, the electric potential applied to the electrically conductive substrate being negative and then positive,
wherein the step (iii) may be repeated once or several times.

16. The process according to claim 14, wherein the current of step (b) has a current density comprised between 0.1 $mA/cm^2$ and 5 $A/cm^2$.

17. The process according to claim 14, wherein the acidic aqueous solution containing ions of the copper to be deposited is an acidic aqueous solution containing a water-soluble salt of the copper to be deposited.

18. The process according to claim 17, wherein the water-soluble salt of the copper to be deposited is selected from $CuSO_4$, $CuCl_2$, $Cu(ClO_4)_2$, and a mixture thereof.

* * * * *